Dec. 6, 1932.    M. PIER    1,890,437
PRODUCTION OF VALUABLE HYDROCARBONS FROM CARBONACEOUS
MATERIALS, TARS, MINERAL OILS, AND THE LIKE
Original Filed Nov. 20, 1928
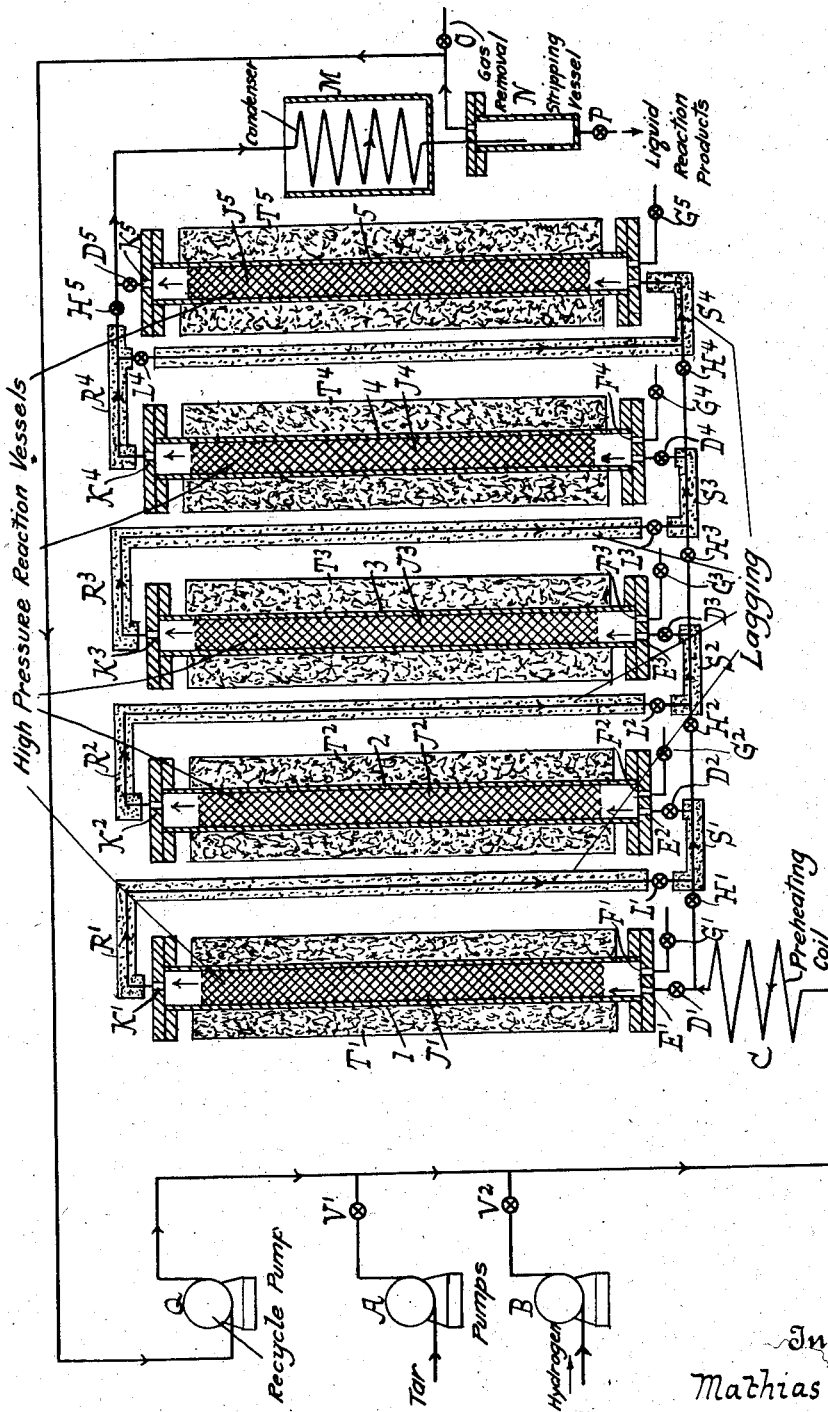
Inventor
Mathias Pier
By his Attorneys Patented Dec. 6, 1932

1,890,437

UNITED STATES PATENT OFFICE

MATHIAS PIER, OF HEIDELBERG, GERMANY, ASSIGNOR, BY MESNE ASSIGNMENTS, TO STANDARD-I. G. COMPANY, OF LINDEN, NEW JERSEY, A CORPORATION OF DELAWARE

PRODUCTION OF VALUABLE HYDROCARBONS FROM CARBONACEOUS MATERIALS, TARS, MINERAL OILS, AND THE LIKE

Application filed November 20, 1928, Serial No. 320,764, and in Germany November 24, 1927. Renewed May 12, 1932.

Valuable products containing liquid hydrocarbons obtained from various kinds of coal, tars, mineral oils and the like have hitherto been produced by treatment of the same with hydrogen or gases supplying the same at elevated temperatures and pressures in a single reaction vessel. A process has also already been suggested according to which the products obtained from one vessel, for example in the form of vapor, are catalytically treated in a second reaction vessel arranged behind the first.

I have now found that the destructive hydrogenation of carbonaceous materials, such as the various kinds of coal, tars, mineral oils and the like, especially as regards the consumption of energy and the simplification of the entire operation, may be carried out in an advantageous manner by conducting the products which are to be treated together with hydrogen through more than two reaction vessels arranged one behind the other in such a manner that no appreciable cooling occurs between the various reaction vessels.

The avoidance of appreciable cooling between the various reaction vessels is effected, for example, by making the connections between the separate reaction vessels very short or by employing a high rate of flow of the materials under treatment or by surrounding the connections, and, if desired, the reaction vessels with a jacket of a heating medium flowing in a special circle or by any of these means combined. Small quantities of gas are sufficient for the employment as a heating medium.

In accordance with the present invention extremely large charges may be employed and far less gas is needed than would be the case with the same charge in vessels arranged singly or in parallel formation; most suitably the gas is repeatedly used in a circular course.

In consequence of the decrease in the quantity of gas in contrast with the usual processes, the energy recovered in the regenerators is greatly increased, because, the smaller the total quantity of gas passing through the regenerator, the smaller are the losses in heat. Moreover, the replacement of the 10 heat regenerators which would be used with 10 separate reaction vessels, by a single heat regenerator, which is possible in accordance with the present invention, is of considerable advantage, since the heat radiation from 10 small regenerators is much greater than it is from one large regenerator, whilst it is also common knowledge that large units are much more economical than small units.

The preheating of the materials to be treated and of the hydrogenating gases may be carried out in the regenerators and/or in special preheaters, which are preferably not heated through the walls which are subjected to pressure, in cases when the materials are preheated under pressure. The production of heat in the preheaters may be carried out, for example, by means of electrical resistance heating. The preheaters may also simply contain a heating medium, for example gases or vapors of any composition which have been heated, and which in turn heat the materials which take part in the reaction to the necessary temperature. When the plant is in operation, the preheater may, if desired, be partially or entirely eliminated, according to the efficiency of the heat tone of the reaction.

It is possible to convey heat from one reaction vessel to another by suitable choice of the velocity of flow of the reacting components and in this manner fluctuations in temperature and undesirable excessive local heating may be avoided, and an equalization of heat between the separate reaction vessels may be brought about.

Fluctuations in the reaction temperature, to which the destructive hydrogenation processes are very sensitive, may also be avoided by employing a heating medium which is passed in a special cycle. For this purpose comparatively small quantities of gas are sufficient which again means an economy in energy.

As regards the attention required in the operation this process is very simple, since, if desired, it is only necessary to have an inlet for the initial materials and an outlet for the products. The removal of the residues is also greatly simplified, because these may be passed to a place, for example behind the last reaction vessel, with the consequent saving of numerous discharge valves, conduits and the like. Moreover, by the simplified heat regeneration a great saving in materials, for example in high pressure valves and the like, is effected.

Moreover, the process according to the present invention has the great advantage that the separate reaction vessels may be temporarily eliminated from the process in order to allow of their being cleaned or cleared out or for the purpose of regenerating the catalyst, or for interchanging them with an auxiliary reaction vessel, without interruption of the process as a whole.

The hydrogenating gases are preferably introduced together with the materials to be treated. The distribution and the intimate mixing of the hydrogenating gases with the materials to be treated is effected by employing high speed linear currents, by which injurious local deposition or thickening is simultaneously avoided. Generally speaking, it is not necessary to employ special stirring apparatus.

The amount of pressure and the linear velocity of the stream are so chosen that there is still an excess of hydrogen in the last reaction vessel.

The joints between the separate reaction vessels are preferably made short so that losses of heat are reduced to a minimum.

The initial materials may be employed in the state of liquid or vapor, and materials of the nature of coal are preferably treated in the form of suspensions. In cases where a residue is produced, it is preferable to arrange that all the liquid products are not distilled off, but that a sufficient quantity of the same remains behind to facilitate the removal of the residue. Before separating the hydrogen from the liquid products leaving the reaction vessel, the mixture is preferably cooled, in order to prevent injury to the conduits by deposition.

The operation may be carried out in the presence of catalysts, and in cases where these are employed in the form of suspensions they may be returned to the reaction after the operation. When working with catalysts they may be carried along with the moving hot liquid, for example, dispersed in a finely divided or colloidally dissolved state or in a state of suspension in a current of the gas. All those catalysts suitable for the art of destructive hydrogenation may be employed, in particular those immune to poisoning by sulfur. As examples of catalysts suitable for the purposes of the present invention may be mentioned catalysts comprising compounds containing sulfur in combination, for example metallic sulfids, in particular the heavy metal sulfids and more especially those of the iron group, either alone or as mixtures with one another or with metals, metalloids, active charcoal, coke or the like or with oxids, hydroxids, or carbonates or with other materials of a catalytic or of inert nature. The sulfur may also be combined with the catalyst by adding sulfites or sulfates thereto or by the addition of sulfur to metals or oxids. A very suitable catalyst may be obtained by treating iron with hydrogen sulfid at an elevated temperature. Particularly suitable catalysts of this class are, for example, cobalt sulfid, iron sulfid, zinc sulfid, nickel sulfid, manganese sulfid and the like or mixtures thereof, for example, mixtures of cobalt sulfid with nickel sulfid or of cobalt sulfid with manganese sulfid, or of cobalt sulfid mixed with iron sulfid, or with zinc sulfid or with aluminium oxid, with or without an addition of inert substances. Catalysts consisting of or containing a metal of the 6th group of the periodic system, such as molybdenum, chromium, tungsten or uranium or the compounds thereof or mixtures of these substances are also particularly suitable. As examples of this type of catalysts may be mentioned molybdic acid or ammonium molybdate, tungsten sulfid, tungstic acid, chromium hydroxid and chromic acid. Mixtures of chromium or tungsten with other catalysts, such as with cobalt, nickel or iron may also be employed. Activation of the catalysts or the addition of substances increasing their mechanical strength may also be of advantage, this being effected for example with substances having a basic action, such as potassium carbonate, aluminium hydroxid or calcium carbonate. Carriers, such as lumps of aluminium silicate may also be employed with advantage. As further catalysts may be mentioned oxidic catalysts comprising zinc oxid, chromium oxid or manganese oxid or mixtures of these, if desired, with an addition of a compound containing fixed nitrogen, such as ammonium sulfid or such nitrids as are comparatively stable against the action of water, for example silicon nitrid or titanium nitrid. These said oxidic catalysts may be employed in conjunction with other substances, such as lumps of fire-clay, quartz, asbestos, pumice, coke, active charcoal, metals, in particular heavy metals, metalloids, oxids, sulfids, carbids, and the like and mixtures thereof with the said substances. As still further examples of suitable catalysts may be mentioned, such containing at least one of the elements silver, copper, cadmium, lead, bismuth, tin in the form of its compounds, further the difficultly reducible metal oxids or carbonates, such as magnesia, lithium carbonate, boric acid, alumina, the rare earths including the difficultly reducible oxids of metals from the 4th group of the periodic system, or the oxids of zinc, manganese or vanadium. The catalysts may contain several of these substances or also other substances, for example metals from the 8th group of the periodic system, such as iron. As specific examples of these catalysts may be mentioned such obtained by impregnating porous refractory materials with solutions of lead nitrate, or of stannous chlorid, silver nitrate or of copper hydroxid, either alone or in admixture with compounds of iron, cobalt and the like. Further may be mentioned catalysts containing the oxids of silver or of titanium, or lithium carbonate, magnesite, manganous oxid, silver borate or mixtures of copper oxid with cerous oxid or of silver with cobalt oxid and the like, and also porous refractory masses coated with vanadium oxid or thorium oxid or with a mixture of compounds of uranium and zinc or of silver and tungsten. These latter compounds may also be employed as such without application to the said porous materials. As further suitable catalysts may be mentioned catalysts containing active charcoal or the metalloids boron, silicon, phosphorus, arsenic, selenium, tellurium or the compounds thereof or halogens. These metalloids may advantageously be employed together with elements from the 2nd to the 8th group of the periodic system, in particular such selected from the 6th group of the periodic system. The catalysts may for example contain the following acids or their salts, namely phosphoric acid, arsenious acid, silicic acid, boric acid, hydrofluoric acid, hydrochloric acid, selenious acid and the like. As specific examples may be mentioned silicon carbid, alder-wood charcoal which has been glowed at 800° C. and impregnated with phosphoric acid, calcium phosphate, molybdenum phosphate, tungsten phosphate, iron phosphate, aluminium phosphate, arsenious acid together with molybdenum or tungsten, silicids, for example iron silicid containing 15 per cent of silicon, active silica, hydrosilicates, borids, such as titanium borid or iron borid, calcium fluorid, molybdenum with 10 per cent of aluminium chlorid, molybdenum with 10 per cent of aluminium chlorid, molybdenum with 10 per cent of cadmium chlorid, molybdic acid with sodium selenite. Compounds containing fixed nitrogen may also be employed with advantage in the reaction. Thus ammonia or its salts, for example, ammonium sulfid and in some cases organic compounds of nitrogen may also be advantageous. Such nitrids as are fairly stable against the action of water have been found to give particularly good results. As further examples of suitable catalysts may be mentioned such containing one or more elements from $a$ (the 4th to the 8th group of the periodic system, in particular such from the 6th group of the periodic system and more particularly molybdenum) together with $b$ (small amounts of other elements from the 2nd to the 7th group of the periodic system or copper or gold or the compounds thereof). The elements from the 2nd and 3rd group may however also be employed in large amounts. Thus mixtures containing molecular proportions of molybdic acid with magnesia or with copper or with aluminium hydroxid, or mixtures of tungstic acid with zinc oxid or of vanadium oxid with magnesia furnish good results. Excellent catalysts are further molybdic acid with about 10 per cent of chromium oxid or of vanadium oxid, molybdic acid with about 10 per cent of uranium oxid or of thorium oxid or of manganous oxid, further tungstic acid containing about 10 per cent of chromium oxid or of a mixture of uranium oxid, cobalt and a small amount of chromium oxid. Again another very suitable class of catalysts is formed by the noble metals or lead or tin or compounds thereof on carriers, in particular on magnesia or magnesite or chromium oxid. As examples of this class of catalysts may be mentioned ruthenium, palladium, platinum, gold, lead or tin or magnesia or magnesite or platinum or gold or chromium oxid. Catalysts containing small amounts of silver or of mixtures of copper with zinc or with cadmium in a free state or in chemical combination and preferably also boron or aluminium or silicon or titanium, or vanadium, or tantalum or chromium or molybdenum or tungsten or cobalt in a free or combined state or mixtures of these are also very suitable. Examples of such catalysts are tantalic acid containing 10 per cent of silver, molybdic acid containing 10 per cent of silver or silica containing 10 per cent of a mixture of copper and zinc. Again another class of catalysts consists of refractory metals or alloys on which small amounts of solid oxids of elements having a catalytic action from the 3rd to the 7th group of the periodic system have been deposited. The said metals or their alloys are preferably employed in an etched condition and preferably acidified solutions or salts of the said oxids are employed as the etching agent.

The products may be kept in motion within the separate reaction vessels, for example by imparting to the material under treatment such an intensive state of movement in all those parts of the apparatus, where it is subjected to heat treatment, that no injurious local thickening occurs, and ensuring a good distribution of the hydrogenating gas in the product under treatment, the participants in the reaction being preferably admitted and removed in a continuous manner. This state of motion of the liquid materials under treatment may, for example, be set up by introducing the hydrogenating gas through numerous small apertures, for example through perforated or sieve plates, which, if desired, are arranged in several layers one above the other and/or through one or several nozzles, which preferably have the form of ejectors, under a pressure considerably in excess of that prevailing in the reaction vessel, in such a manner that a continuous drawing up and a whirling motion of vortex character is set up in the liquid materials, accompanied by a very thorough intermixing of the said materials with gas bubbles of smallest dimensions. In place of or besides a high excess of pressure, a mechanical stirrer may be employed, which, if desired, may also be provided with apertures or nozzles for the introduction of hydrogenating gas.

The movement of the liquid products, with the object of preventing injurious local thickening may also be suitably effected by circulating the liquid reaction materials in a hot state. This may be brought about by special mechanical appliances inside the reaction furnace, or also by conducting the liquid material out of the furnace and back into it again. In the latter case care must be taken to prevent any cooling which might result in local deposition of thickened portions. The circulation may be produced by pumps of the most varied types, such as reciprocating pumps, valveless pumps, for example geared pumps, centrifugal pumps and the like. This method of working enables the rate of flow to be greatly increased. Several liquid circulations may also be produced simultaneously. Under certain circumstances it is also of advantage to maintain a hot gas circulation, the reaction products formed being separated off either periodically or continuously.

If desired, products may be added to or removed from the separate reaction vessels, for example at an intermediate state of the reaction. Ashes, residues and the like may also be removed from the separate furnaces. The residues may also be removed together with the reaction product and the subsequent separation carried out in any known and suitable manner.

The process in accordance with the present invention is carried out with advantage in vertical reaction vessels (towers), under an elevated pressure, preferably above 20 atmospheres. Pressures, for example of 50, 100, 200 or even 1000 atmospheres come into question depending on the degree of destructive hydrogenation desired, higher pressures leading to a more intensive treatment than lower pressures. However, in some cases it will be advantageous to employ atmospheric pressure. The process is carried out at temperatures lying above the decomposition temperature of the materials to be treated, but usually between about 300° and 700° C. Different temperatures may be maintained in the various reaction vessels, for example in such a manner that the initial materials are treated in several stages, by subjecting the constituents which are not affected or not appreciably affected by the first treatment to a treatment by themselves at a higher temperature than in the first stage of the destructive hydrogenation. Accordingly not the whole of the product obtained by the first treatment is subjected to a repeated treatment at a higher temperature, but the initial materials are subjected to treatment at a definite temperature, preferably as low as possible owing to which only a part of the materials is converted into valuable liquid substances. The unchanged remainder is separated and partly, or wholly, subjected to treatment with hydrogen at a higher temperature than in the first stage of the treatment. Distinct fractions may also be separated off before the further treatment at the higher temperature and may be worked up in another way, for example for the preparation of lubricating oils and the like. In the first stage it is preferable to employ a higher velocity of throughput. The height of the temperature employed in the second stage depends on the nature of the initial materials, on the conditions in the first treatment and on the nature of the products which are desired; thus, for example, if mainly aromatic compounds are desired, temperatures of 500° C. or more are employed and if the temperature in the first stage is rather high, the temperature in the second stage must be correspondingly higher.

In some cases well defined products may be obtained by the employment of further stages with still higher temperatures. In the final stage at relatively high temperature, it is preferable to employ the materials in the form of vapor, and in this manner aromatic hydrocarbons may chiefly be obtained, if desired.

The nature of the invention will be further illustrated by the following example with reference to the accompanying drawing, though it is understood that the invention is not limited to this particular modification.

Brown coal low-temperature tar containing about 30 per cent of constituents boiling up to 325° C. and about 10 per cent of asphaltum, is treated with hydrogen under a pressure of 200 atmospheres in 5 reaction vessels 1—5 arranged in series, one or more of which can be shut out from the circulation in order to regenerate the catalyst. The tar and the hydrogen are introduced into the circulation by means of the compression pumps A and B, respectively, through the valves $V_1$ and $V_2$. The initial materials are preheated in the coil C to a temperature of about 410° C. They enter into the reaction vessel 1 through the admission valve $D_1$ by way of the vent $E_1$. An effluent pipe $F_1$ is arranged in the base of the said vessel near $E_1$ through which the liquid reaction products formed can be drawn off through the valve $G_1$. The initial materials pass upwards in the said reaction vessel 1 through the catalyst mass $J_1$ consisting of molybdenum trioxid and zinc oxid which is rigidly arranged in the reaction vessel. The said reaction vessel is surrounded by a heat insulating material $T_1$. The materials under treatment issuing from the reaction vessel by way of the vent $K_1$ arranged in the upper cover of the said vessel, pass by way of the pipe $R_1$ through the valve $L_1$ and the pipe $S_1$ by way of the admission valve $D_2$ and the vent $E_2$ into the reaction vessel 2. The pipes $R_1$ and $S_1$ are well insulated against loss of heat. On account of the positive heat tone of the reaction, the temperature of the materials treated in the reaction vessel 1 has risen to about 425° C. and the said materials enter the second reaction vessel with a temperature of about 420° C. The reaction vessel 2 and the following reaction vessels 3—5 also contain catalysts consisting of molybdenum trioxid and zinc oxid rigidly arranged therein. All parts of the reaction vessels 2—5 are arranged similarly to the arrangement in the reaction vessel 1 and the corresponding parts are enumerated by the same letters only bearing different numerals. At the upper end of the reaction vessel 2 the materials have a temperature of about 435° C. and they enter the reaction vessel 3 with a temperature of about 430° C. The temperature rises from vessel to vessel by about 5° to 10° C., so that the products leave the reaction vessel 5 with a temperature of about 450° to 460° C. by means of the valve $D_5$. They are passed through the condenser M into a stripping vessel N in which the liquid products which have been condensed collect at the bottom and are drawn off by means of the valve P. The gases pass on through a conduit to the circulating pump Q. Part of the circulating gases which consist of gaseous hydrocarbons formed in the course of the reaction may be drawn off through the valve O and may be replenished by fresh gases introduced by means of the pump A. A pressure of about 200 atmospheres is maintained throughout the circulation. It is not necessary to remove the liquid reaction products from each of the reaction vessels, for example part of the reaction products may be removed from the reaction vessel 3 while the rest is drawn off from the reaction vessel 5. The products drawn off from the reaction vessel 3 are practically free from asphaltum and when worked up for the production of lubricating oils yield a good engine oil in an amount of about 30 per cent of the said products, the remainder consisting mainly of middle oils which are usually returned to the process or which are separately worked up for the production of benzine. Mainly middle oils are also drawn off from the reaction vessel 5 by way of the valve $G_5$, the liquid in the reaction vessel being maintained at a constant level. The vaporous products leaving the reaction vessel 5 together with the gases which are condensed in the coil M consist of benzine to the extent of about 50 per cent, the remainder being a light oil which may either be employed as such or which may be converted in a second destructive hydrogenation process into benzine.

In order to regenerate the catalyst in any given reaction vessel the said vessel may be excluded from the circulation. Thus, for example, if the reaction vessel 1 is to be excluded from the circulation, the valve $D_1$ is closed, the circulating valve $H_1$ is opened and the valve $L_1$ closed. The pressure in the reaction vessel 1 is thereupon released. The valves G, L and $D_5$ are arranged as three-way cocks. The initial materials to be subjected to the reaction then pass by way of the preheating device C directly through $H_1$, $S_1$ and $D_2$ into the reaction vessel 2. The liquid contents of the reaction vessel 1 are now removed through $F_1$ and a valve $G_1$ and air is blown into the reaction vessel, which is still hot, by way of the valve $L_1$ or also in some cases a mixture of air and nitrogen, care being taken that the temperature does not rise above 500° C. during this process.

The valves and effluent pipes are arranged somewhat differently in the reaction vessel 5 from the arrangement in the other reaction vessels, but when this vessel is to be excluded from the circulation, the method of working is exactly the same as in the case of the other vessels, air being blown in by means of the valves $D_5$ and removed by means of $G_5$.

What I claim is:—

1. A process for producing liquid hydrocarbons by destructive hydrogenation of carbonaceous materials in the liquid state which comprises effecting the reaction with hydrogen in at least three reaction vessels arranged in series, at a temperature of between 300° C. and 700° C. and a pressure of at least 20 atmospheres, the speed of flow of the materials and the temperature in at least the first two vessels of the series being such that the reaction is only partially effected therein, all the vapors resulting from the treatment in at least said first two vessels being passed through all the remaining vessels of the series while avoiding appreciable cooling in the flow of materials from one vessel to another.

2. A process as defined in claim 1 wherein the hydrogenation is carried out in the presence of a catalyst comprising molybdenum and the hydrogen is employed repeatedly in a closed cycle.

3. A process as defined in claim 1 wherein brown coal tar is destructively hydrogenated in five vessels arranged in series, the temperature in the first two vessels being between 410° and 430° C. and in the others between 430° C. and 460° C.

In testimony whereof I have hereunto set my hand.

MATHIAS PIER.